Jan. 9, 1968  F. J. FORTE  3,362,635
TEMPERATURE CONTROLLING MEANS FOR OVENS AND THE LIKE
Original Filed April 12, 1962  8 Sheets-Sheet 1
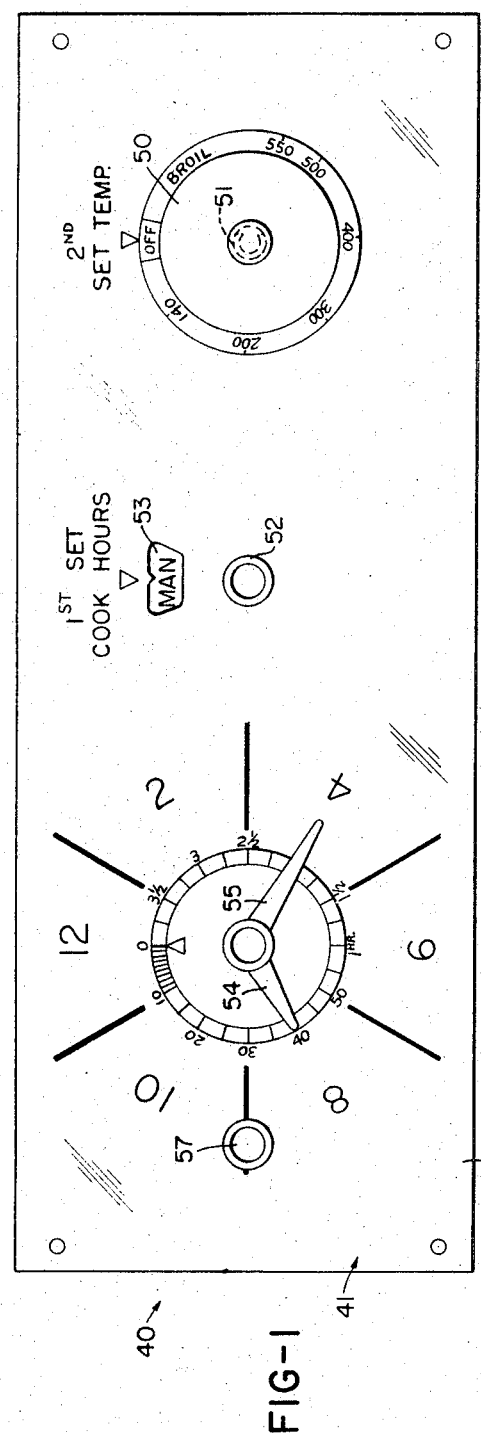
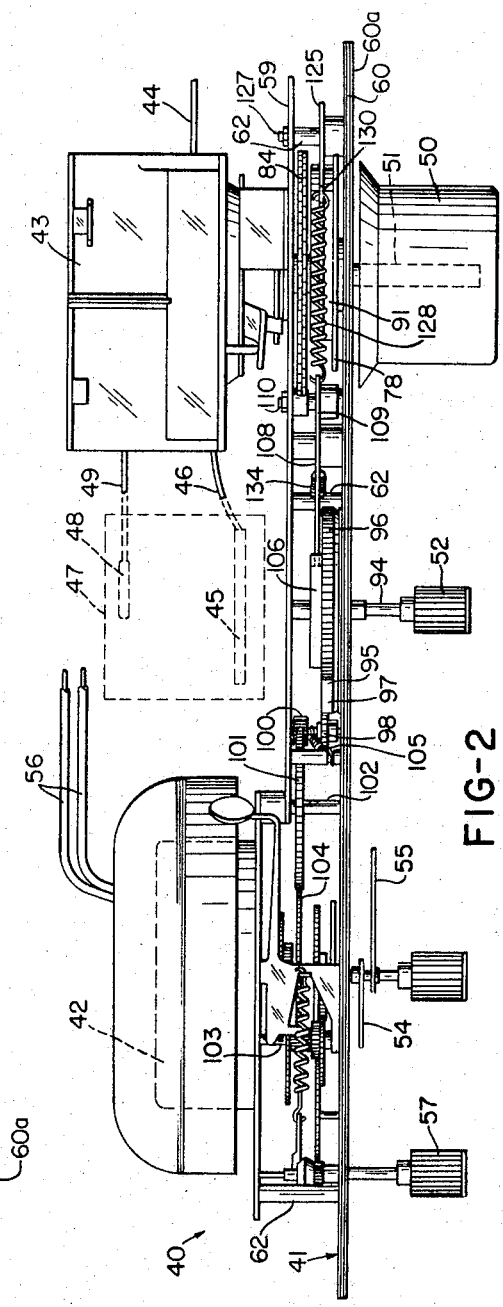
INVENTOR.
FRANCIS J. FORTE

INVENTOR.
FRANCIS J. FORTE

INVENTOR.
FRANCIS J. FORTE

Jan. 9, 1968   F. J. FORTE   3,362,635
TEMPERATURE CONTROLLING MEANS FOR OVENS AND THE LIKE
Original Filed April 12, 1962   8 Sheets-Sheet 4
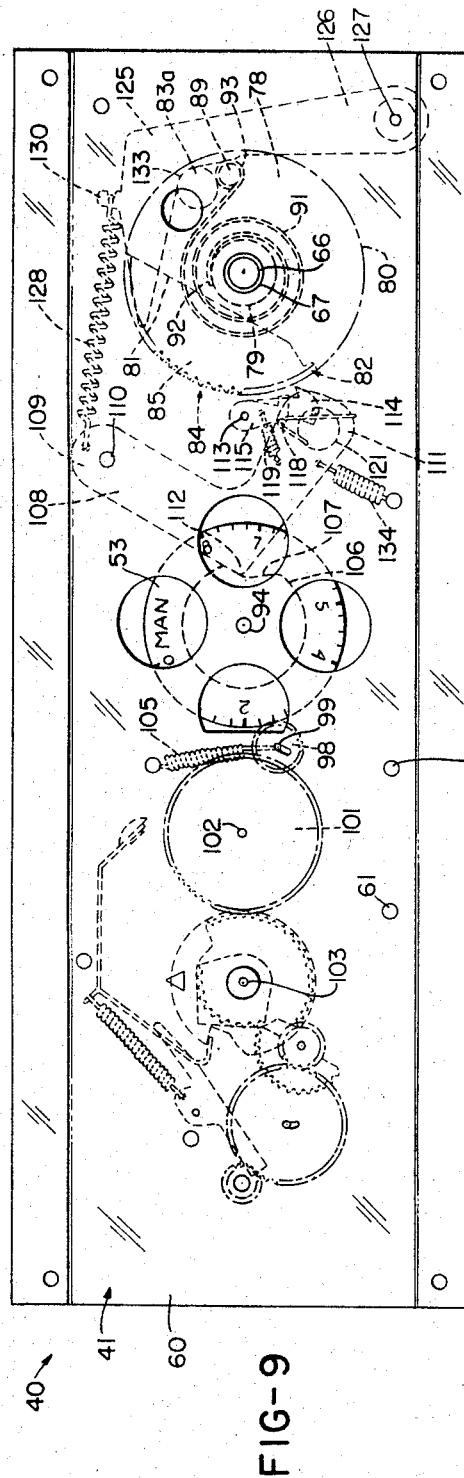
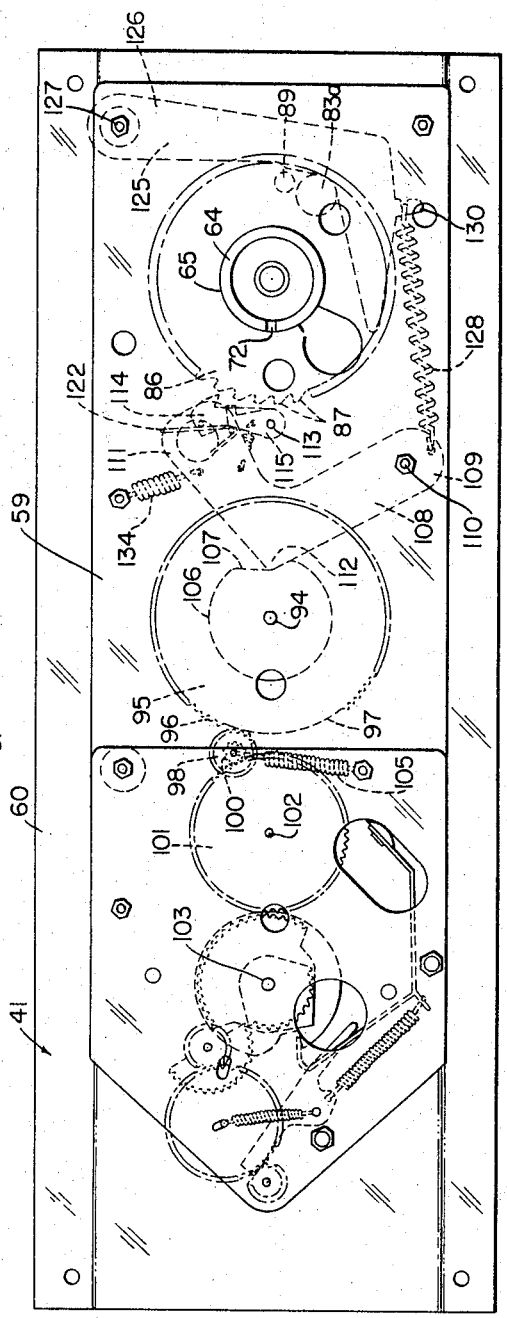
INVENTOR.
FRANCIS J. FORTE

INVENTOR.
FRANCIS J. FORTE

INVENTOR.
FRANCIS J. FORTE

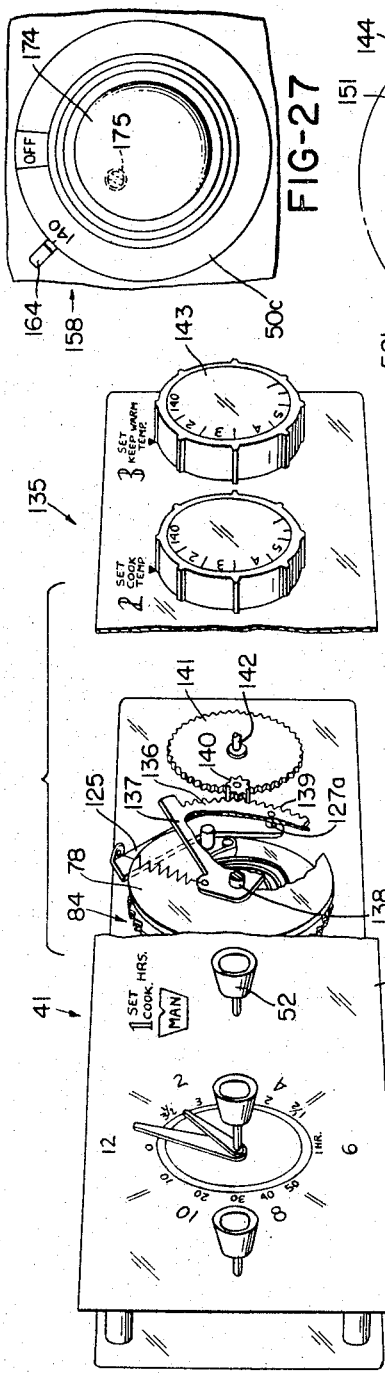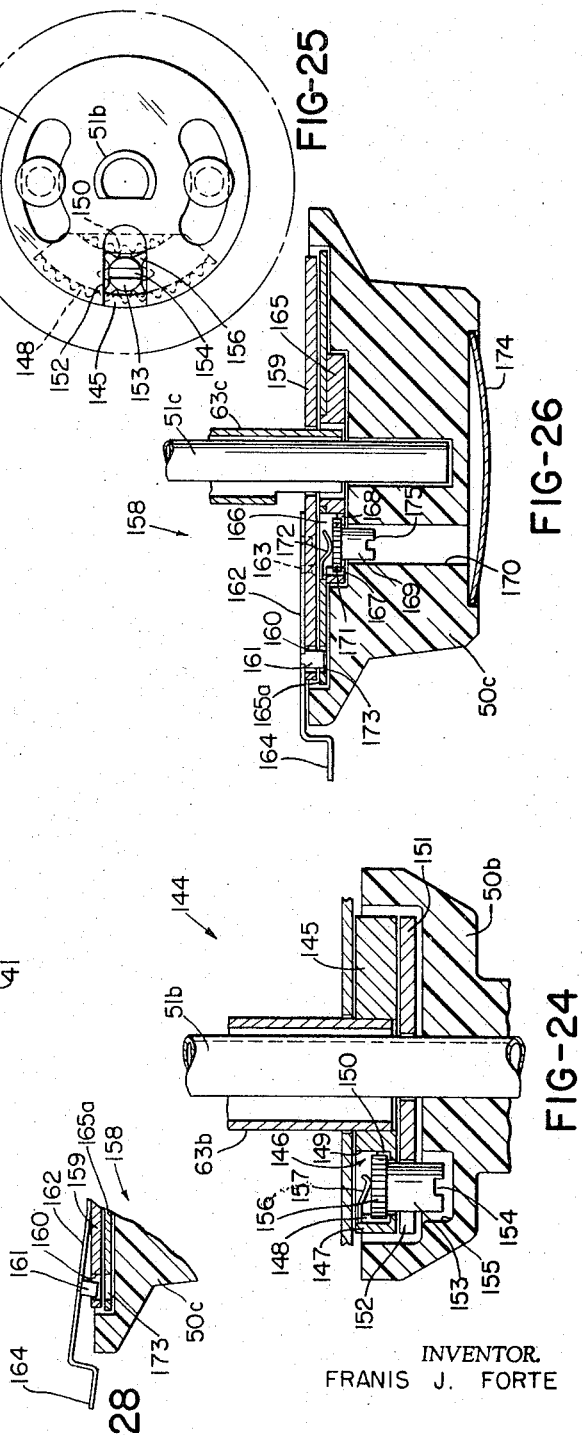

United States Patent Office 3,362,635
Patented Jan. 9, 1968

3,362,635
TEMPERATURE CONTROLLING MEANS FOR
OVENS AND THE LIKE
Francis J. Forte, New Haven, Conn., assignor to Robertshaw Controls Company, a corporation of Delaware
Application July 21, 1965, Ser. No. 480,227, now Patent No. 3,304,001, dated Feb. 14, 1967, which is a continuation of abandoned application Ser. No. 186,909, Apr. 12, 1962. Divided and this application Jan. 30, 1967, Ser. No. 612,674
10 Claims. (Cl. 236—46)

ABSTRACT OF THE DISCLOSURE

This disclosure relates to a control means for a domestic oven or the like wherein the control means includes a frame means rotatably carrying a collar adapted to telescopically receive a control shaft of a thermostatic device whereby the thermostatic device can be manually set to control the temperature in the oven, the control device including means for automatically rotating the collar and interconnected control shaft of the thermostat to a lower temperature setting after the occurrence of the event, such as the lapse of a predetermined time period, whereby the control device will maintain the temperature in the oven at the reduced non-cooking and warmth retaining temperature until the housewife or the like manually turns the control device to its "Off" position.

This application is a divisional patent application of its copending parent application, Serial Number 480,227, filed July 21, 1965, now U.S. Patent No. 3,304,001, which, in turn, is a continuation application, Serial Number 186,909, filed April 12, 1962, now abandoned.

This invention relates to an improved oven or burner control device as well as to an improved method of operating such oven or burner.

Heretofore, conventional domestic ovens or the like of either the electric or gas type have been provided with automatic timer means so that the housewife or the like can place food in the oven at any one period of the day and have the oven automatically come on at a set time of the day and cook the food at a selected temperature for a selected time interval while the housewife is away.

However, if the period of time that the food must remain in the oven before the oven cooks the same is relatively long, food spoilage can occur. Further, should the housewife be late in returning, the cooked food has cooled and requires further heating thereof before the same can be served.

According to the teachings of this invention, however, an improved control device is provided whereby food can be placed in the oven and the housewife can select the desired length of time that the food is to be cooked at a desired temperature whereby the food will be immediately cooked by the oven during the desired time interval so that no food spoilage will occur.

Thereafter, the control device of this invention automatically reduces the temperature of the oven to a predetermined temperature, such as a warming and noncooking temperature, whereby the food can remain in the oven until served, the food being held at a serving temperature by the control device of this invention.

The control device of this invention is so constructed and arranged that the control device is readily adapted to be interconnected to conventional thermostatic devices utilized to control conventional oven burners and the like whereby the control devices of this invention can be manufactured by one manufacturer and can be utilized by various oven manufacturers with their particular thermostatic devices.

Further, the control device of this invention is so designed that the housewife or the like can change the temperature setting to a lower temperature after the required cooking hours have been set or part of the cooking time has been completed.

In addition, the control device of this invention is so constructed and arranged that the control device can be utilized in a conventional manner for cooking purposes without utilizing the aforementioned automatic lower temperature feature.

Accordingly, it is an object of this invention to provide an improved control device having one or more of the novel features set forth above or hereinafter shown or described.

Another object of this invention is to provide an improved method of operation of an oven, burner or the like.

Other objects, uses and advantages of this invention are apparent from a reading of this description which proceeds with reference to the accompanying drawings forming a part thereof and wherein:

FIGURE 1 is a front view of the improved control device of this invention.

FIGURE 2 is a top view of the control device of FIGURE 1.

FIGURE 9 is a front view of the control device of FIGURE 1 with the control panel thereof removed.

FIGURE 10 is a rear view of the control device of FIGURE 1 with the theromstat device and timer motor removed.

FIGURE 23 is a broken away, partially exploded, perspective view illustrating another control device of this invention.

FIGURE 24 is a fragmentary, cross-sectional view illustrating another control device of this invention.

FIGURE 25 is a front view of the parts illustrated in FIGURE 24 with the control knob thereof removed.

FIGURE 26 is a view similar to FIGURE 24 and illustrates another control device of this invention.

FIGURE 27 is a fragmentary front view of the control device of FIGURE 26.

FIGURE 28 is a view similar to FIGURE 26 and illustrates the control device in one of the operating positions thereof.

Figure 3:
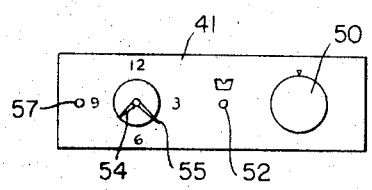
FIGURES 3–6 are respectively front views of other control devices of this invention having the various control parts thereof disposed in different positions relative to each other.
Figure 4:
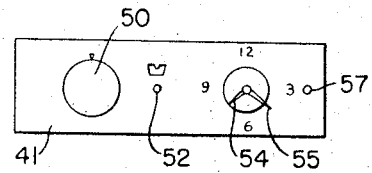
Figure 5:
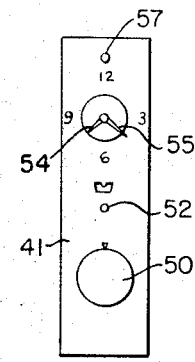
Figure 6:
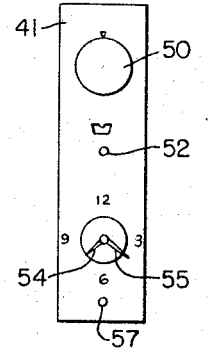
Figure 12:
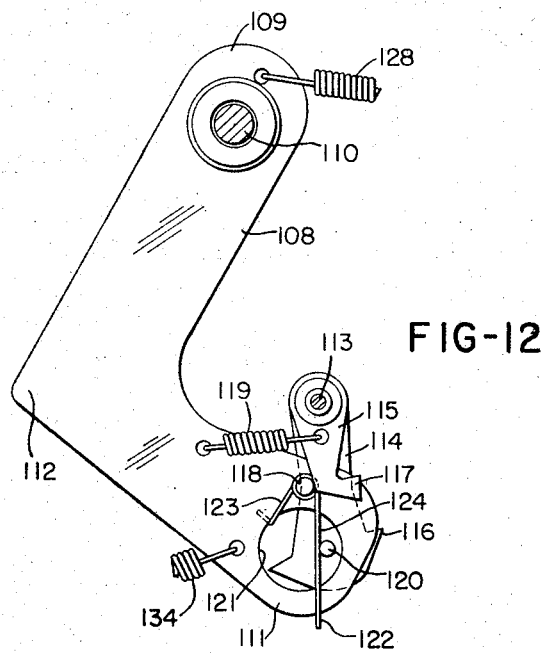
FIGURE 12 is a fragmentary front view illustrating the assembly of certain of the parts of the control device illustrated in FIGURE 11.

While the various features of this invention are hereinafter described and illustrated as being particularly adaptable for providing an oven or burner control, it is to be understood that the various parts of this invention can be utilized singly or in any combination thereof to provide other constructions as desired.

Therefore, this invention is not to be limited to only the embodiments illustrated in the drawings, because the drawings are merely utilized to illustrate one of the wide variety of the uses of this invention.

Referring now to FIGURES 1 and 2, one embodiment of an improved oven or burner control device of this invention is generally indicated by the reference numeral 40 and comprises a suitable frame structure 41 adapted to be interconnected to any desired range or oven structure to provide at least part of the control panel thereof, the frame construction 41 being readily adaptable to be interconnected to a conventional timer or clock motor 42 and a conventional thermostat device 43 in a manner hereinafter described, whereby the frame structure 41 and the operating parts of the control device of this invention can be manufactured by one manufacturer and be utilized with the conventional timer motor 42 and thermostat 43 of an oven or range manufacturer or the like. Of course, the range or oven manufacturer can also make the frame structure 41 and the operating parts carried thereby, if desired.

The particular details of the thermostat 43 do not form any part of this invention whereby it will suffice to state that the thermostat 43 can be an electric or mechanical operating structure which is adapted to maintain the temperature of an oven or burner at a selected temperature upon proper positioning of a control shaft thereof in a manner conventional in the art.

For example, the thermostat 43 illustrated in FIGURE 2 comprises an electrically operated device receiving suitable power from a cable 44 and is interconnected to a suitable burner or burners 45 by a cable 46, the burner or burners 45 being disposed in an oven 47. A suitable temperature sensing device 48 is disposed in the oven 47 and is interconnected to the thermostat 43 by the element 49.

In this manner, when a control knob 50 of the oven control 40 of this invention is rotated from the "off" position thereof to an "on" position thereof, the knob 50 rotates a control shaft 51 of the thermostat 43 to cause the thermostat 43 to operate the burner or burners 45 in such a manner that the temperature of the oven 47 is maintained at the temperature corresponding to the temperature setting of the control knob 50 in a conventional manner.

As previously set forth, one of the features of the control device 40 of this invention is to permit the housewife or the like to place food in the oven 47 and, after determining the required cooking time and cooking temperature for the food, the housewife rotates a control knob 52 from the "manual" position illustrated in FIGURE 1 in a clockwise direction to indicate the desired number of hours or minutes on a dial 53 that it is desired to have the oven 47 cook the food at a selected cooking temperature.

Thereafter, the housewife moves the thermostat control knob 50 from the "off" position illustrated in FIGURE 1 in a clockwise direction to the desired temperature setting, such as 400° or the like.

Immediately, the thermostat 43 functions in a conventional manner to bring the temperature of the oven 47 up to 400° and maintains the temperature of the oven at 400° during the entire time interval set by the control knob 52 in a manner hereinafter described.

After the set time for the cooking temperature of the oven 47 has lapsed by the dial 53 returning to its "manual" position, the control device 40 of this invention automatically returns the control knob 50 of the thermostat 43 in counterclockwise direction to a relatively low and noncooking temperature, such as 140° or the like, whereby the temperature of the oven 47 is reduced to 140° and maintained at that reduced temperature by the thermostat 43 until the housewife turns the control knob 50 to the "off" position to terminate operation of the oven 47.

In this manner, the housewife can place food in the oven 47 and have the same immediately cooked to prevent spoilage thereof and thereafter have the food maintained at a warming and non-cooking temperature so that when the food is subsequently removed from the oven 47 the same is at a serving temperature. Thus, the housewife or the like can be entertaining her guests even though the dinner has been completely cooked in the oven 47 without worrying that the food will be overcooked or cold when it is desired to serve the same.

While the control device 40 of this invention illustrates in FIGURES 1 and 2 suitable clock arms 54 and 55 operated by the timer motor 42 receiving suitable electrical current from leads 56, it is to be understood that the control device 40 of this invention can be utilized without such clock structure as long as a suitable timer motor 42 or the like is utilized in combination therewith as will be readily apparent when reference is hereinafter made to FIGURE 11.

Similarly, while the oven control 40 illustrated in FIGURES 1 and 2 provides a control knob 57 for operating an alarm providing timer mechanism in a conventional manner, it is to be understood that the control device 40 of this invention can be utilized without such alarm providing timer, if desired, the control device 40 of this invention merely being illustrated with other mechanism which can utilize the same timer motor 42 to operate other mechanism as well as the temperature reducing feature of this invention.

Further, while the various controls are hereinafter described as being in the pattern illustrated on the control panel 60a in FIGURE 1, it is to be understood that the various control parts of the oven control 40 can be arranged in other patterns as is fully illustrated in FIGURES 3–6 merely disclosing some of the other patterns that could be provided.

The particular details of the control device 40 will now be described and reference is made to FIGURES 7 and 8 which illustrate that the conventional thermostat devices 43, normally have C-shaped or D-shaped control shafts 51 projecting therefrom and operatively interconnected to a screw-like adjusting member 58 which, when rotated, controls the temperature of the oven 47 or the like in a manner well known in the art.

While the thermostat device 43 has been previously described as an electrical device for controlling either electrical heater means or gas heater means, it is to be understood that the thermostat device 43 can comprise a thermostat control device similar to those disclosed in the copending application, Serial Number 833,742, filed August 14, 1959, now U.S. Patent Number 3,132,803, whereby the thermostat device 43 is adapted to maintain the oven at a relatively low non-cooking temperature as described in the copending application.

The frame structure 41 of the control device 40 of this invention includes a rear plate 59 and a front plate 60 interconnected in spaced relation relative to each other by a plurality of pivot pillars 110 and 127 or the like secured to the rear plate 59 by nuts and carrying suitable spacing means 62 and the like to hold the plates 59 and 60 at a fixed distance relative to each other and receive the various control parts of this invention therebetween, the front plate 60 being adapted to have a control panel 60a superimposed thereon and secured thereto in any suitable manner.

A stepped, hollow collar 63 has one end 64 thereof projecting through a bore 65 formed in the rear plate 59 and the other end 66 thereof received in a bore 67 formed in the front plate 60, the collar 63 being rotatable relative to the frame means 41 for a purpose hereinafter described and having an outwardly directed annular flange 68 held against the inside surface of the rear panel 59 by a disc spring 69 bearing against the inside surface of the front panel 60 and a shoulder 70 on the collar 63.

Figure 7:
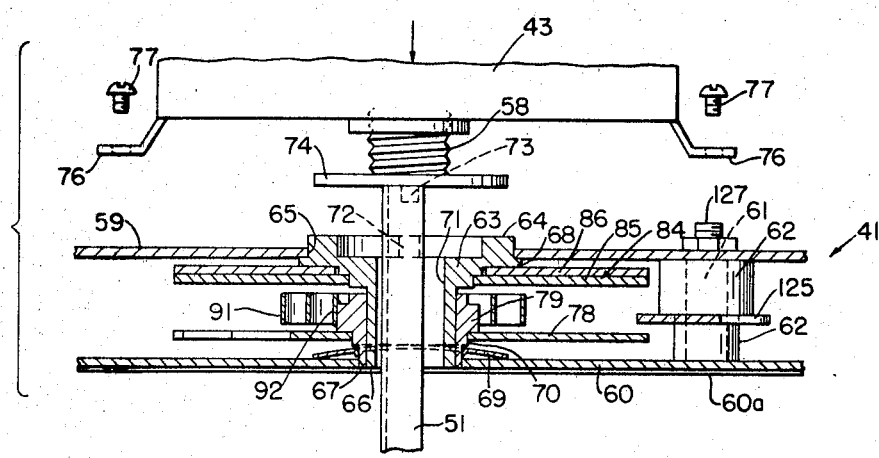
FIGURE 7 is a fragmentary, partially exploded, top cross-sectional view disclosing the method of interconnecting a thermotat device to the control device of this invention.
Figure 8:
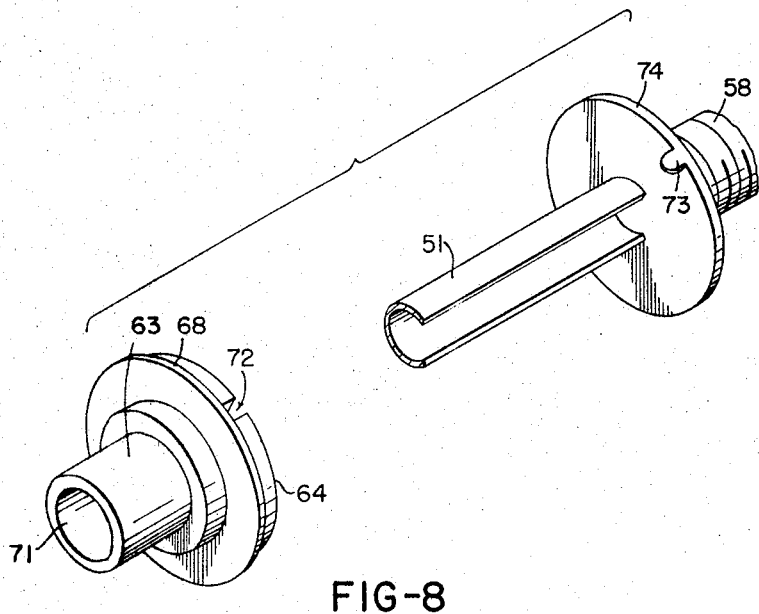
FIGURE 8 is an exploded perspective view illustrating certain parts of the structure illustrated in FIGURE 7.

The collar 63 has a bore 71 passing therethrough adapted to telescopically receive the control shaft 51 of the thermostat 43 in the manner illustrated in FIGURE 7, the bore 71 being provided with a recess or slot 72 adapted to receive a key or tab 73 formed on a disc-like member 74 carried between the control shaft 51 and adjusting screw 58 to interconnect the control shaft 51 and collar 63 together so that the same will rotate in unison.

The thermostat 43 is pushed downwardly from the position illustrated in FIGURE 7 and has a plurality of outwardly directed ears or lugs 76 thereof abut the rear surface of the rear plate 59 so that the thermostat 43 can be secured thereto by a plurality of threaded fastening members 77.

The control knob 50 is adapted to be unterconnected to the control shaft 51 of the thermostat 43 in any conventional manner whereby rotation of the knob 50 causes like rotation of the control shaft 51, rotation of the control shaft 51 causing like rotation of the collar 63 and various operating parts of the control device 40 of this invention in a manner hereinafter described.

It is to be understood that the thermostat device 43 includes suitable stops to prevent the control knob 50 illustrated in FIGURE 1 from being rotated in a counter-clockwise direction past the "off" position thereof and to prevent the control knob 50 from being rotated in a clockwise direction past the "broil" position thereof.

Figure 11:
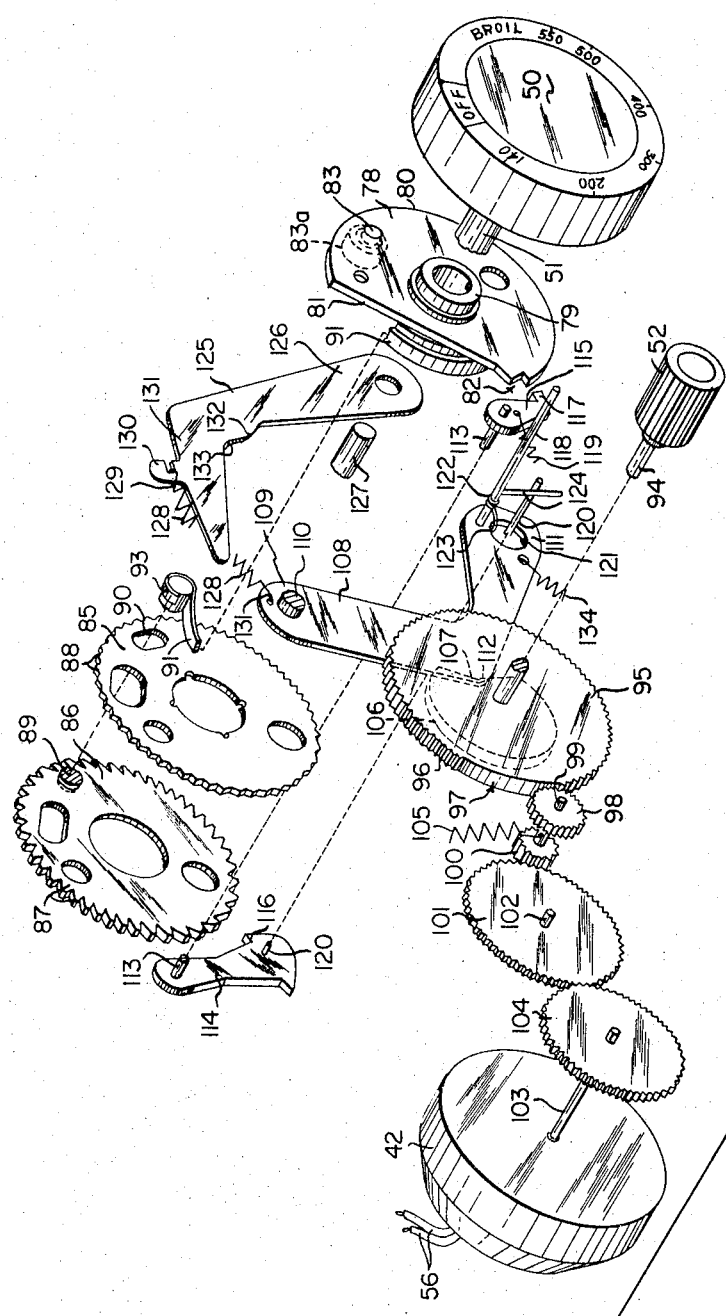
FIGURE 11 is an exploded perspective view illustrating certain of the operating parts of the control device of FIGURE 1.
Figure 13:
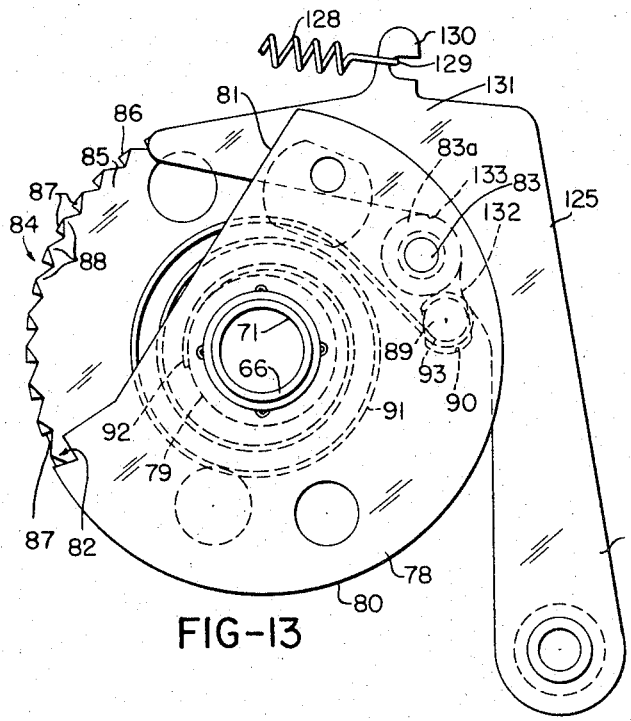
FIGURE 13 is a fragmentary, front view illustrating certain of the parts of the control device of this invention assembled together and disposed in one operating position thereof.

As illustrated in FIGURES 7 and 11, a first disc construction 78 is secured to a sleeve 79 loosely received around the collar 63 whereby the collar 63 is rotatable relative to the disc construction 78.

As illustrated in FIGURE 11, the disc construction 78 has a circular portion 80 and a cutaway portion 81 defining a notch 82 for a purpose hereinafter described, the disc construction 78 carrying a rearwardly directed, substantially cylindrical pin means 83 carrying a roller 83a on the free end thereof for a purpose hereinafter described.

Figures 14, 15:
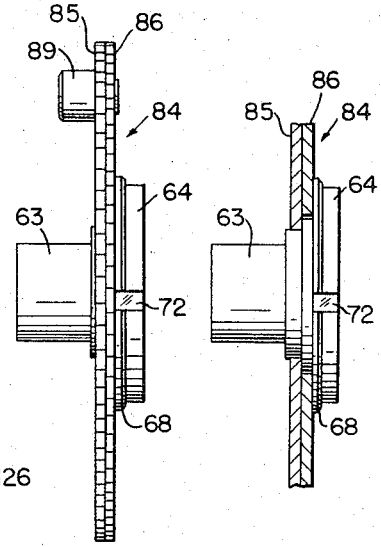
FIGURE 14 is a partial side view of certain operating disc constructions of the oven control of this invention.
FIGURE 15 is a fragmentary, axial, cross-sectional view similar to FIGURE 14.

As illustrated in FIGURE 7, a second disc construction 84 is disposed about the collar 63 and comprises two substantially circular discs 85 and 86, the disc 85 being fixed to the collar 63 to rotate in unison therewith while the disc 86 is loosely received on the collar 63 and relatively movable relative thereto for the purpose hereinafter described as fully illustrated in FIGURE 15.

The disc 86 has a plurality of angularly disposed substantially flat ended teeth 87, FIGURE 11, formed around the periphery thereof while the disc 85 has a plurality of substantially V-shaped teeth 88 formed around the periphery thereof.

The disc 86 carries a frontwardly projecting pin means 89 which passes through an elongated slot 90 formed in the disc 85 to interconnect the discs 85 and 86 together while permitting limited movement therebetween for a purpose hereinafter described.

A coiled spring or mainspring 91, FIGURES 7 and 11, has the inner end 92 thereof secured to the sleeve 79 carried by the disc construction 78 and the outer end 93 thereof inter-connected to the portion of the pin means 89 projecting beyond the disc 85.

In this manner, the spring 91 tends to rotate the disc construction 84 in a counterclockwise direction relative to the disc construction 78 until the pin 89 of the disc construction 84 abuts against the pin 83 carried by the disc construction 78.

When it is desired to operate the oven 47 at any selected temperature without utilizing the keep-warm feature of this invention, the control knob 52 has its dial 53 disposed in the "manual" position illustrated in FIGURE 1 whereby the thermostat control knob 50 can be rotated from the "off" position thereof to any desired temperature setting in a clockwise direction.

As the control knob 50 is rotated in a clockwise direction, the collar 63 is rotated in a clockwise direction in unison therewith and carries the disc construction 84 in a clockwise direction. As the disc construction 84 is rotated in a clockwise direction, the disc construction 78 is rotated in a clockwise direction therewith because the spring 91 is interconnected thereto and carries the disc construction 78 along with the clockwise rotation of the disc construction 84.

As will be apparent hereinafter, when the control knob 50 has been rotated beyond the particular keep-warm temperature setting thereof, such as 140° or the like, the control knob 52 is rendered inoperative to set a desired time interval that the oven 47 is to be maintained at a selected temperature.

Therefore, the thermostat control knob 50 must be disposed between its "off" position and the keep-warm position thereof before the control construction 40 of this invention can be utilized to maintain the temperature of the oven 47 at a selected temperature for a selected time and thereafter reduce the temperature of the oven 47 which is to be maintained at a selected temperature.

Therefore, the thermostat control knob 50 must be disposed between its "off" position and the keep-warm position thereof before the control construction 40 of this invention can be utilized to maintain the temperature of the oven 47 at a selected temperature for a selected time and thereafter reduce the temperature of the oven 47 to a relatively low warming and non-cooking temperature.

The time-setting control knob 52 is interconnected to a shaft 94, FIGURE 11, rotatably mounted between the plates 59 and 60, the shaft 94 being interconnected to a gear 95 having a plurality of teeth 96 disposed about part of the periphery thereof. The periphery of the gear 95 does not have the teeth 96 in the area 97 thereof to prevent meshing relation of the gear 95 with an idler gear 98 carried on a shaft 99 disposed between the plates 59 and 60, the reduced area 97 of the gear 95 being disposed adjacent the gear 98 when the control knob 52 is disposed in its "manual" position so that the gear 98 cannot drive the gear 95.

The shaft 99 carries another gear 100 disposed in meshing relation with an enlarged gear 101 carried on a shaft 102 rotatably mounted between the plates 59 and 60, of the frame means 41, the gear 101 being interconnected to the output shaft 103 of the timer motor 42 by a suitable gear train or the like.

For example, the timer motor 42 can have the output shaft 103 thereof carrying a gear 104 disposed in meshing relation with the gear 101 as illustrated in FIGURE 11, the timer motor 42 driving a suitable clock structure or not as desired.

The shaft 99 carrying the idler gear 98 is transversely movable relative to the plates 59 and 60 of the frame means 41 and is normally urged upwardly by a tension spring 105 to tend to hold the idler gear 98 in driving relation with the teeth 96 of the gear 95 when the gear 95 is rotated to a position thereof to permit the teeth 96 to be disposed in meshing relation with the gear 98.

However, when the control knob 52 is set in the "manual" position thereof, the recessed portion 97 of the gear 95 is disposed adjacent the gear 98 whereby operation of the timer motor 42 does not drive the gear 95.

Should the control knob 52 be rotated to a time indicating position thereof, the gear 95 is likewise rotated with the teeth 96 thereof camming the idler gear 98, in opposition to the force of the tension spring 105, away from meshing relation with the teeth 96 until the gear 95 is set in the desired position thereof. Thereafter, the spring 105 brings the idler gear 98 into meshing relation with the teeth 96 of the gear 95 and whereby the timer motor 42 drives the gear 95 until the recessed portion 97 thereof is disposed adjacent to the gear 98, at which time, the dial 53 is disposed in the "manual" position thereof.

Thus, by a suitable gear arrangement, the gear 95 can be set to rotate through any desired period of time, such as between zero and eight hours or the like.

The gear 95 carries a substantially circular cam member 106 on the rear side thereof, the cam member 106 having a camming notch 107 formed therein.

A substantially L-shaped lever 108 has one end 109 thereof pivotally mounted on a pivot pillar 110 extending between the plates 59 and 60 of the control device 40 and being secured to the rear plate 59 by a nut whereby the other end 111 of lever 108 is adapted to be moved to the right or the left about the pivot pillar 110.

The elbow 112 of the lever 108 is adapted to be disposed in the camming notch 107 of the cam 106 when the control knob 52 is disposed in the "manual" position thereof.

However, when the control knob 52 is rotated to a time-indicating position thereof, the cam 106 is rotated in unison therewith in a clockwise direction and cams the lever 108 in a counterclockwise direction to move the end 111 of the lever 108 to the right for a purpose hereinafter described.

The lever 108 is held in its counterclockwise position by the cam 106 as long as the gear 95 is being rotated in a counterclockwise direction by the gear 98. However, as soon as the gear 95 reaches its "manual" position, the elbow 112 of the lever 108 is pulled into the notch 107 of the cam 106 by a tension spring 134 having one end thereof attached to the lever 108 and the other end thereof attached to the frame means 41 whereby the lever 108 is rotated in clockwise direction to move the end 111 thereof to the left for a purpose hereinafter described.

A pivot pin 113, FIGURE 11, extends between the plates 59 and 60. A pair of pawls 114 and 115 are respectively pivotally carried by the pivot pin 113 whereby the pawl 114 is adapted to have a tooth 116 thereof received in the recesses between the teeth of the discs 85 and 86 to prevent counterclockwise rotation of the disc construction 84 in a manner hereinafter described. Similarly, the pawl 115 has a tang or tooth 117 adapted to be received in the notch 82 of the disc construction 78 to prevent clockwise rotation thereof for a purpose hereinafter described.

A pin 118 projects outwardly from the end 111 of the lever 108 and is adapted to engage the pawl 115 whereby movement of the end 111 of the lever 108 to the right, upon clockwise rotation of the cam 106, causes the pin 118 to move the pawl 115 to the right to have the tang 117 thereof received in the path of the notch 82 of the disc construction 78, the pawl 115 being moved to the right in opposition to a force of a tension spring 119 having the end thereof interconnected thereto and the other end thereof interconnected to the lever 108.

The pawl 114 has a forwardly directed pin 120 extending therefrom and passing through a circular aperture 121 formed in the end 111 of the lever 108.

A spring 122 is coiled about the pin 118 and has one end 123 thereof interconnected to the lever 108 and the other end 124 thereof bearing against the pin 120 carried by the pawl 114 whereby the spring 122 tends to move the pawl 114 to the right in a counterclockwise direction about the pivot pin 113.

However, when the lever 108 is disposed in the notch 107 of the cam 106, the pawl 114 is prevented from engagement with the disc construction 84 because the spring 122 pushes the pin 120 only against the righthand side wall of the aperture 121 in the lever 108.

When the control knob 52 is rotated to a time-indicating position thereof, the end 111 of the lever 108 is moved to the right whereby the spring 122 likewise moves the pawl 114 to the right into engagement with the disc construction 84, the pin 118 moving the pawl 115 to the right in unison with the pawl 114.

A substantially L-shaped lever 125 has one end 126 thereof pivotally mounted on a pivot pillar 127 disposed between the plates 59 and 60 of the frame means 41 and secured to the rear plate by a nut, the L-shaped lever 125 normally being urged in a counterclockwise direction about the shaft 127 by a tension spring 128 having one end 129 interconnected to a projection 130 formed on the other end 131 of the lever and the other end thereof interconnected to end 109 of the lever 108.

The lever 125 has a camming surface 132 disposed below the elbow 133 thereof for a purpose hereinafter described.

When it is desired to utilize the thermostatic control device 40 of this invention to regulate the temperature of the oven 47 without utilizing the "keep warm" feature of this invention, the control knob 52 is disposed in its "manual" position and the thermostatic control knob 50 is disposed in its "off" position as illustrated in FIGURE 1.

Figures 18, 19:
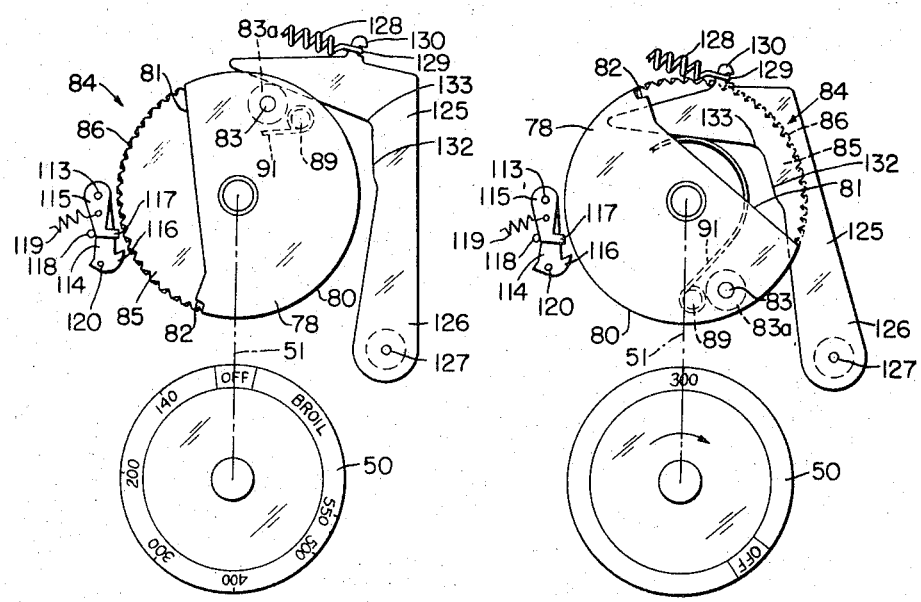
FIGURE 18 is a partial front view of certain of the assembled operating parts of this invention disposed in one operating position thereof.
FIGURES 19–22 are views similar to FIGURE 18 respectively illustrating the operating parts thereof in other operating positions thereof.

When the control knobs 52 and 50 are respectively disposed in their "manual" and "off" positions, the disc constructions 78 and 84 are disposed in the position illustrated in FIGURE 18 whereby the pin 83 and roller 83a of the disc construction 78 is disposed beyond the elbow 133 of the lever 125 and the pin 89 of the disc construction 84 has passed beyond the camming surface 132 of the lever 125 to hold the lever 125 to the right in opposition to the force of the tenison spring 128.

The housewife or the like subsequently turns the control knob 50 in a clockwise direction to the desired temperature setting, such as 300°. As the control knob 50 is rotated in a clockwise direction, the control knob 50 through the thermostat control shaft 51 rotates the collar 63 and thus the disc construction 84 in a clockwise direction. As the disc construction 84 is rotated in a clockwise direction, the main spring 91 causes the disc construction 78 to also rotate in a clockwise direction in unison with the disc construction 84.

As the disc construction 78 is rotated in a clockwise direction past the 140°, keep-warm setting of the control knob 50, the circular peripheral surface 80 of the disc construction 78 moves into the path of movement of the tang 117 of pawl 115 whereby an attempt to rotate the control knob 52 from the "manual" position thereof to any time setting position is prevented by the camming surface 80 of the disc construction 78 because the pawl 115 cannot be pushed to the right a sufficient distance to clear the elbow 112 of the lever 108 from the notch 107 of the cam member 106.

Therefore, the control knob 50 must be disposed in its "off" position or between its "off" position and the keep-warm setting thereof before the control knob 52 can be rotated from its "manual" position to some time-indicating position.

As the pins 83 and 89 and the roller 83a of the disc constructions 78 and 84 pass beyond the cam area of the lever 125 in a clockwise direction while the temperature setting of the control knob 50 is increased, the lever 125 moves in to bear against a limit rod (not shown) which prevents further movement thereof in a counterclockwise direction about its pivot pillar 127.

Thus, it can be seen that the control knob 50 can be utilized without the control knob 52 to set a desired temperature for the oven 47 whereby the thermostat device 43, through the proper rotation of the control shaft 51, maintains the temperature of the oven 47 at the temperature setting indicated by the control knob 50.

When it is desired to turn off the oven 47, the control knob 50 is rotated in a counterclockwise direction back to its "off" position.

As the control knob 50 is rotated back to its "off" position, the roller 83a of the disc construction 78, while being rotated in a counterclockwise direction, comes into contact with the camming surface 132 of the lever 125 while the pin 39 of the disc construction 84 comes into contact with the camming surface 132 of the lever 125 so that further counterclockwise rotation of the disc constructions 78 and 84 causes the pin 89 to cam against the camming surface 132 of the lever 125 to pivot the lever 125 in a clockwise direction about its pivot pillar 127 to permit the pins 83 and 89 and roller 83a to assume the position illustrated in FIGURE 18 when the control knob 50 is disposed in its "off" position.

When it is desired to utilize the control device 40 to maintain the temperature of the oven 47 at a desired cooking temperature for a predetermined length of time, and thereafter, reduce the temperature of the oven 47 to a warming and non-cooking temperature, the control knob 50 must be disposed in its "off" position or at any temperature setting thereof below the keep-warm position thereof, such as 140°.

Thereafter, the control knob 52 is rotated in a clockwise direction from its "manual" position to any desired time indicated setting thereof, for example, four hours or the like.

As the control knob 52 is moved from its "manual" position to a time-indicating position thereof, the gear 95 and cam 105 mounted on the shaft 94 of the control knob 52 are rotated in a clockwise direction whereby the gear teeth 96 of the gear 95 are placed in meshing relation with the idler gear 98 and, simultaneously, the cam 106 has the notch 107 thereof clearing the elbow 112 of the lever 108, to cause the lever 108 to rotate in a counterclockwise direction about its pivot pillar 110.

Figures 20, 21:
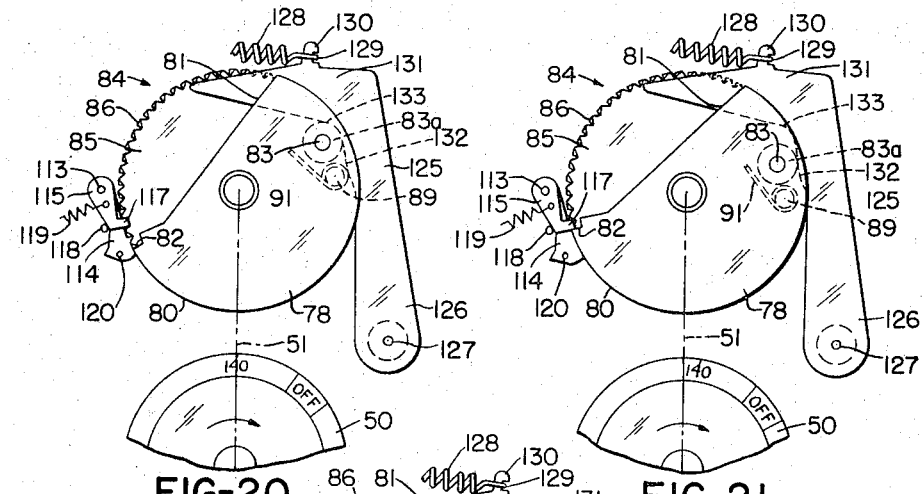

When the end 111 of the lever 108 is moved to the right by the cam 106, the pin 118 carried by the end 111 of the lever 108 moves the pawl 115 in a counterclockwise direction whereby the tang 117 thereof is disposed in the path of the notch 82 of the disc construction 78 as illustrated in FIGURE 20.

Simultaneously, the spring 122 acting against the pin 120 carried by the pawl 114 causes the pawl 114 to rotate in a counterclockwise direction about the pivot pin 113 bringing the tang 116 thereof into engagement with the disc construction 84.

Thereafter, the control knob 50 is rotated in a clockwise direction to the desired temperature setting for the oven 47, such as 300° or the like.

However, as the control knob 50 is rotated in a clockwise direction from its "off" position thereof, the disc constructions 78 and 84 rotate in unison therewith a clockwise direction until the notch 82 of the disc construction 78 comes into contact with the tang 117 of the pawl 115 whereby the pawl 115 prevents further clockwise rotation of the disc construction 78 in the manner illustrated in FIGURE 21.

The teeth 87 and 88 on the discs 85 and 86 of the disc construction 84 are so constructed and arranged, that the tang or tooth 116 of the pawl 114 does not prevent clockwise rotation of the disc construction 84 and the disc 85 and 86 merely cam the pawl 114 in a clockwise direction about the pivot pin 113 in opposition to the force of the tension spring 124 to permit such clockwise movement of the disc construction 84.

When the disc construction 78 has the notch 82 thereof disposed against the tang 117 of the pawl 115, the pin 83 of the disc construction 78 is disposed slightly below the elbow 133 of the lever 125 in the manner illustrated in FIGURE 21 for a purpose hereinafter described.

Figure 22:
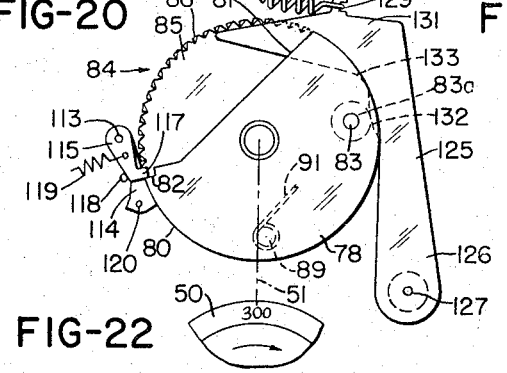

After the disc construction 78 has been prevented from further clockwise rotation by the pawl 115, further clockwise rotation of the control knob 50 causes the disc construction 84 to continue to rotate in a clockwise direction in the manner illustrated in FIGURE 22 whereby the main spring 91 is being continuously wound up because the disc construction 78 remains motionless while the disc construction 84 continues to be rotated in a clockwise direction.

When the control knob 50 has been rotated in a clockwise direction to the desired temperature setting, such as 300° as illustrated in FIGURE 22, the tooth 116 of the pawl 114 is received between the teeth 87 of the disc 86 and prevents the spring 91 from rotating the disc construction 84 in a counterclockwise direction whereby the pawl 114 holds the control shaft 51 at the desired temperature setting thereof.

However, should the housewife or the like accidentally advance the control knob 50 in a clockwise direction past the desired temperature setting, the disc construction 84 is so constructed and arranged that the control knob 50 can be advanced backwardly in a counterclockwise direction to the desired temperature setting.

For example, should the housewife desire that the control knob 50 be disposed in the 300° position thereof and accidentally advances the control knob 50 to the 400° position thereof, the housewife then grasps the control knob 50 and rotates the same back in a counterclockwise direction to the 300° setting thereof.

Figure 16:
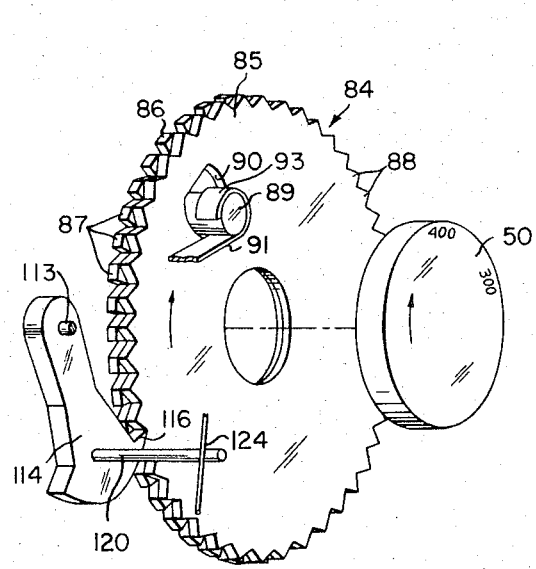
FIGURE 16 is a schematic perspective view illustrating one operating position of the parts illustrated in FIGURES 14 and 15.
Figure 17:
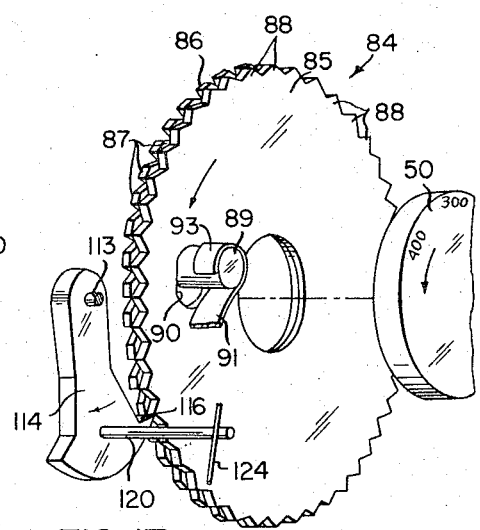
FIGURE 17 is a view similar to FIGURE 16 illustrating the same parts in another operating position thereof.

To accomplish this function of the disc construction 84, reference is now made to FIGURE 16 wherein it can be seen that as the control knob 50 is advanced in a clockwise direction, the disc 85, being fixedly secured to the collar 63, is likewise rotated in a clockwise direction. However, since the disc 86 of the disc construction 84 is loosely mounted on the collar 63, the disc 85 is adapted to be slightly rotated relative to the disc 86 until the left-hand side wall of the slot 90 engages the pin 89 carried by the disc 86 whereby further clockwise rotation of the disc 85 by the control knob 50 causes like clockwise rotation of the disc 86.

When the discs 85 and 86 of the disc construction 84 are disposed in the position as illustrated in FIGURE 16, the tang 116 of pawl 114 is adapted to be seated between the teeth 87 of the disc 86 under the force of the compression spring 122 when clockwise rotation of the control knob 50 is terminated because the teeth 88 of the disc 85 when disposed in the position illustrated in FIGURE 16 permit the tang 116 of the pawl 114 to be received between the teeth 87 of the disc 86 whereby the pawl 114 prevents the spring 91 from rotating the disc construction 84 in a counterclockwise direction.

While the disc 85 is being rotated in a clockwise direction by the control knob 50, the disc 86 is prevented from being rotated relative therewith by the spring 91 until the pin 89 engages the left-hand wall of the slot 90 in the disc 85, whereby further clockwise movement of the disc 85 causes the disc 86 to move in unison therewith in a clockwise direction in the above manner.

Thus, when further clockwise rotation of the control knob 50 is terminated, the pawl 114 prevents counterclockwise rotation of the disc construction 84 in the above manner.

However, should the housewife or the like grasp the control knob 50 to rotate the same in a counterclockwise direction back to the desired temperature setting for the oven 47, initial counterclockwise movement of the control knob 50 causes the disc 85 to rotate in a counterclockwise direction relative to the disc 86 because the pawl 114 is holding the disc 86 from such counterclockwise rotation and the elongated slot 90 in the disc 85 permits such relative movement.

However, slight movement of the disc 85 in a counterclockwise direction relative to the disc 86 causes the teeth 88 of the disc 85 to cam the tang 116 of the pawl 114 in a clockwise direction about its pivot pin 113 to free movement of the disc 86 in a counterclockwise direction.

Thus, the disc construction 84 can be advanced backwardly in a counterclockwise direction to the desired temperature setting of the control knob 50.

When the disc construction 84 is rotated back to the desired temperature setting of the control knob 50, the spring 91 causes the disc 86 to be further rotated in a counterclockwise direction relative to the disc 85, now being held stationary by the collar 63, until the pin 89 abuts the left-hand wall of the slot 90 whereby the discs 85 and 86 again assume the position illustrated in FIGURE 16 so that the tang 116 of the pawl 114 can be again pushed between the teeth 87 of the disc 86 by the spring 122 and prevent counterclockwise movement of the disc construction 84 relative to the disc construction 78.

While the above operation of rotating the control knob 50 from a high setting thereof to a lower setting thereof has been described in connection with accidently moving the control knob 50 to a high temperature setting thereof, it is to be understood that the same procedure is followed should it be desired to have the oven at a high temperature during part of the cooking time and, thereafter, manually reduce the temperature setting of the control knob 50 to a lower temperature setting before the temperature setting is automatically reduced.

Therefore, it can be seen that the control knob 52 can set the desired number of hours and minutes it is desired to maintain the oven 47 at a subsequent cooking temperature setting of the control knob 50 and then the temperature of the oven 47 can be set at the desired temperature setting thereof by the control knob 50.

Once the control knobs 52 and 50 have been set in the above manner, the housewife need not bother the control device 40 because the same functions completely automatically in the following manner.

In particular, the timer motor 42, through the gear train structure 104, 101, 100 and 98, continues to rotate the gear 95 in a counterclockwise direction for the period of time set by the dial 53 while the thermostat 43 maintains the temperature of the oven 47 at the desired temperature setting to the control knob 50 in a conventional manner.

When the gear 95 has been driven back to the position to permit the recessed area 97 thereof to be disposed against the idler gear 98, further rotation of the gear 94 is prevented and the desired number of hours and minutes for maintaining the oven 47 at the desired temperature setting has been reached.

When the gear 95 has been driven back to the "manual" position thereof, the cam 106 is rotated in unison therewith and permits the elbow 112 of the lever 108 to be drawn into the notch 107 thereof under the influence of the tension spring 134 whereby the lever 108 is rotated in a clockwise direction about its pivot pillar 110 to move the end 111 of the lever 108 to the left. As the end 111 of the lever 108 is moved to the left, the right-hand wall of the aperture 121 in the end 111 thereof pulls the pin 120 to the left to carry the pawl 114 away from the disc construction 84.

As the tang 116 of the pawl 114 is pulled away from the teeth 87 of the disc 86, the spring 91 causes counterclockwise rotation of the disc construction 84 whereby counterclockwise rotation of the disc construction 84 causes like counterclockwise rotation of the collar 63 and the control knob 50 back toward the "off" position thereof.

During the counterclockwise rotation of the disc construction 84 by the spring 91, the disc construction 78 remains stationary and holds the pawl 115 in engagement with the notch 82 thereof by the force of the mainspring 91 tending to rotate the disc construction 78 in a clockwise direction whereby the pawl 115 remains in engagement with the disc construction 78 in opposition to the force of the spring 119 tending to pull the same to the left because the pin 118 of the lever 108 has been previously moved to the left.

In this manner the disc construction 78 remains stationary while the disc construction 84 is being rotated in a counterclockwise direcon by the spring 91.

As the disc construction 84 is being rotated in a counterclockwise direction by the spring 91, the pin 89 thereof eventually comes into contact with the roller 83a of the pin 83 of the disc construction 78 in the manner illustrated in FIGURE 21 to tend to rotate the disc construction 78 in a counterclockwise direction therewith.

However, only slight counterclockwise rotation of the disc construction 78 is permitted from the position illustrated in FIGURE 21 because the pin 89 of the disc construction 84 moves the roller 83a of the disc construction 78 into engagement with the elbow 133 of the lever 125 in the manner illustrated in FIGURE 20 whereby the lever 125 prevents further counterclockwise rotation of the disc constructions 78 and 84. In this manner, the control shaft 51 of the thermostat 43 is now disposed and held in a noncooking and warming temperature position thereof, such as 140° or the like.

As the disc construction 78 is moved from the position illustrated in FIGURE 21 to the position illustrated in FIGURE 20, the pawl 115 is released from engagement with the disc construction 78 whereby the tension spring 119 can pivot the pawl 115 in a clockwise direction about its pivot pin 113 into engagement with the pin 118, carried by the lever 108.

Thus, it can be seen that when the desired number of hours has been reached for the cooking setting of the oven 47, the control device 40 of this invention automatically reduces the temperature setting of the oven 47 to a warming and noncooking temperature whereby the temperature of the food in the oven 47 will be held at a serving temperature but will not be further cooked by the oven 47.

Thus, after the food has been cooked, the oven 47 maintains the same at a serving temperature regardless of the length of time the food remains in the oven until the housewife manually returns the control knob 50 to its "off" position.

To return the control knob 50 from the keep-warm temperature setting thereof to its "off" position, the housewife merely grasps the control knob 50 and rotates the same in a counterclockwise direction, counterclockwise rotation of the control knob 50 causing the disc construction 84 to rotate in a counterclockwise direction and have the roller 83a cam against the front inside surface of the lever 125 to move the lever 125 in a clockwise direction about its pivot pillar 127 to permit the pin 83 and roller 83a of the disc construction 78 to clear the elbow 133 thereof and be moved back to the position illustrated in FIGURE 18.

Thus, it can be seen that the control device 40 of this invention permits the oven 47 to be utilized in a conventional manner without any time setting feature thereof. Further, the control device 40 of this invention permits the housewife to place food in the oven and set the control knob 52 to the desired number of cooking hours for the food and, thereafter, set the control knob 50 at the desired cooking temperature for the oven 47 whereby the oven control cooks the food at the desired temperature through a desired number of hours and minutes. Thereafter, the control device 40 reduces the temperature of the oven to a low warming and non-cooking temperature to maintain the food at a serving temperature without further cooking of the same until the housewife removes the food from the oven 47.

While the non-cooking and keep-warm temperature of the oven 47 has been heretofore mentioned as being approximately 140°, it is to be understood that the lever construction 125 can be so constructed and arranged that the same provides a different keep-warm temperature setting of the thermostat 43 by varying the shape of the lever 125, the temperature of 140° merely being exemplary of such a non-cooking and keep-warm temperature setting for the oven 47.

Further, means can be provided for selectively adjusting the keep-warm temperature setting of the thermostat 43.

In particular, reference is made to FIGURE 23 wherein another thermostatic control device of this invention is generally indicated by the reference numeral 135 which has parts thereof substantially identical to the thermostatic control 40 previously described except that the thermostatic control 135 has means for adjusting the desired temperature setting of the keep-warm position of the lever 125.

For example, the pivot pin 127a of the control device 135 is substantially the same as the pivot pillar 127 for the lever 125 of the control device 40 previously described except that the pivot pin 127a is not fixed relative to the front and rear plates of the control device 135 in the manner of the pivot pillar 127.

Instead, the pivot pin 127a is carried by an arm 136 of a lever 137 pivotally mounted to the frame construction 41 of the control device 135 by a pivot pin 138.

In this manner, pivotal movement of the lever 137 about its pivot pin 138, which is coaxial with the collar 63, changes the position of the pivot pin 127a whereby the lever 125 will stop counterclockwise rotation of the disc constructions 78 and 84 at a different position to hold the control shaft 51 of the thermostat 43 at a different temperature setting thereof.

The arm 136 of the lever 137 has a plurality of teeth 139 disposed in meshing relation with the teeth of a gear 140 disposed in meshing relation with a larger gear 141.

The gear 141 is interconnected to a shaft 142 interconnected to a control knob 143 graduated in different temperature settings thereof whereby rotation of the control knob 143 to the desired temperature setting thereof causes movement of the lever 137 through rotation of the gears 141 and 140 to set a new position for the lever 125 to halt counterclockwise movement of the disc constructions 78 and 84 after the same have been released from the high cooking temperature setting thereof and are to be returned to a low temperature setting thereof.

Thus, it can be seen that the control knob 143 can select a desired return setting of the thermostat 43 in a relatively simple manner.

Another means for adjusting the control device of this invention to return to any desired temperature setting of the thermostat 43 after the timer has returned disc 53 to its manual position, is generally indicated by the reference numeral 144 in FIGURES 24 and 25 wherein the basic parts of the control device 144 are substantially the same as the control device 40 previously described and indicated by like reference numerals followed by the reference letter b.

However, the collar 63b of the control device 144 is not interconnected to the control shaft 51b by the plate 74 previously described.

Instead, an annular plate 145 is keyed to the collar 63b in any suitable manner whereby the rotation of the collar 63b causes like rotation of the other plate 145 or vice versa.

The plate 145 has an elongated sector slot 146 formed therein wherein the left-hand wall 147 of the plate 145 has a plurality of long teeth 148 formed thereon and the right wall 149 of the slot 146 has a plurality of short teeth 150 formed thereon.

Another annular plate 151 is disposed adjacent to the plate 145 and is movable relative thereto, the plate 151 being suitably keyed or otherwise secured to the control shaft 51b in any suitable manner.

The plate 151 has a suitable slot 152 formed therein and adapted to receive an adjusting pin 153 having a bifurcated end 154 projecting outwardly beyond the plate 151 and being received in a suitable cavity 155 formed in the control knob 50b suitably interconnected to the control shaft 51b.

The pin 153 carries a gear 156 on the rear end thereof, the gear 156 normally being disposed in meshing relation with teeth 148 and teeth 150 by a leaf spring 157.

In this manner, the control knob 50b is interconnected to the collar 63b because the plate 151 is splined to the plate 145 by the pin 153 when the pin 153 is disposed in the position illustrated in FIGURE 24.

When it is desired to adjust the keep-warm setting of the control device 144 to another temperature setting thereof, the control knob 50b is removed from the controlled shaft 51b and a screwdriver or the like is inserted in the bifurcated end 154 of the pin 153 whereby the pin 153 can be depressed in the slot 146 rearwardly against the opposition of the force of the leaf spring 157 to clear the gear 156 from the teeth 150.

When the gear 156 has been cleared from the teeth 150, the pin 153 is rotated in the proper direction by the screwdriver or the like to cause the gear 156 thereof to react against the teeth 148 of the plate 145 and rotate the plate 145 relative to the plate 151, whereby the collar 63b is rotated to a new position relative to the control shaft 51b.

Thereafter, the screwdriver is released from the pin 153 whereby the leaf spring 157 returns the pin 153 to the position illustrated in FIGURE 24 so that the gear 156 if locked from rotational movement thereof by the gear teeth 148 and 150 and interconnected to the plate 145 to plate 151. In this manner, rotation of the control knob 50b causes rotation of the control shaft 51b and like rotation of the collar 63b in the manner previously described to perform the desired functions.

Thus, it can be seen that the adjusting pin 153 of the control device 144 can be utilized to selectively change the return setting of the control knob 50b by the disc constructions 78 and 84 when a desired number of cooking hours has been reached.

Another control device of this invention is generally indicated by the reference numeral 158 in FIGURES 26–28 and has the basic parts thereof formed in substantially the same manner as the control device 40 previously described whereby like parts thereof are indicated by like reference numerals followed by the reference letter c.

As in the control device 144 previously described, the control shaft 51c of the control device 158 is not interconnected to the collar 63c by the plate 74 in the manner of the control device 40 previously described.

Instead a plate 159 is keyed or otherwise secured to the collar 63c in any suitable manner, the plate 159 having a slot 160 formed therethrough and receiving a locking tang 161 carried on a spring member 162 secured to the plate 159 by rivets 163 or the like. The spring lever 162 has a handle and temperature indicating portion 164 extending beyond the control knob 50c in the manner illustrated in FIGURE 27 whereby the pointer 164 indicates the temperature at which the control knob 50c will return to a keep-warm setting thereof.

Another plate 165 is disposed adjacent to the plate 159 and is movable relative thereto, the plate 165 having a slot 166 formed therein and provided with long teeth 167 on one side thereof and shorter teeth 168 on the other side thereof.

A pin 169 is disposed in a bore 170 formed through the control knob 50c and registering with the slot 166 in the plate 165, the pin 169 having a gear 171 formed on the rear end thereof and normally disposed in meshing relation with the teeth 167 and 168 by a leaf spring 172 whereby the pin 169 splines the plate 165 to the control knob 50c which is interconnected to the control shaft 51c.

The plate 165 is interconnected to another plate 165a which has a plurality of radially and circumferentially disposed slots 173 formed therein which are respectively adapted to receive the tang 161 of the spring lever 162 when the spring lever 162 is disposed in the position illustrated in FIGURE 26. In this manner, the plate 165 is interconnected to the plate 159 by the tang 161 so that the control shaft 51c is fixed relative to the collar 63c.

When the control device 158 has been installed in combination with an oven or the like, the oven is operated in the above manner to cause the control knob 50c to return to its keep-warm position.

When the control knob 50c has been returned to its keep-warm position, the field service man places a test thermocouple in the oven 47 to determine what is the actual temperature that the control knob 50c is maintaining the oven. For example, should it be found that the indicating pointer 164 is disposed at 140°, and the oven is actually being maintained at 150°, the field service man removes a spring retainer 174 from the control knob 50c and inserts a screwdriver in the bifurcated end 175 of the pin 169 to depress the same rearwardly and in opposition to the force of the leaf spring 172 to cause the gear 171 to clear the teeth 168.

When the gear 171 has cleared the teeth 168 of the plate 165, the gear 171 can be rotated against the teeth 167 by the screwdriver and cause like rotation of the plates 165 and 159 relative to the control knob 50c.

In this manner, the pointer 165 and collar 63c are moved relative to the control shaft 51c until the pointer 164 indicates a temperature that corresponds to the test thermocouple.

Thereafter, the screwdriver is released and the spring 172 returns gear 171 into locking engagement with the teeth 167 and 168 whereby the control knob 50c is fully interconnected to the plate 165.

Subsequently, the housewife can adjust the keep-warm temperature setting by merely grasping the indicating handle 164 and pushing rearwardly thereon in the manner illustrated in FIGURE 28 to clear the tang 161 from its respective slot 173 in the plate 165a. With the tang 161 clear of the plate 165a, the housewife then rotates the control knob 50c in the desired direction to bring the desired temperature setting thereof adjacent the indicating pointer 164.

The housewife then lets the tang 161 enter the registering slot 173 in the plate 165a to interconnect the plates 159 and 165 together whereby the relative positions between the control shaft 51c and the collar 63c have been adjusted so that the disc constructions 78 and 84 will return the control shaft 50c to a different keep-warm temperature setting thereof.

Therefore, it can be seen that various control devices and the like have been provided by this invention wherein a burner or oven can be maintained at a selected temperature for a selected period of time and thereafter have the temperature setting thereof reduced to a predetermined or selected temperature whereby food can be maintained at a serving temperature without further cooking thereof for any desired length of time.

Further, certain of the control devices of this invention have means for selecting a desired keep-warm temperature setting.

While the form of the invention now preferred has been disclosed as required by the statutes, other forms may be used, all coming within the scope of the claims which follow.

What is claimed is:

1. In combination, frame means, a rotatable collar means rotatably mounted to said frame means and being adapted to be interconnected to a control shaft means of an open thermostat means whereby said collar means and said control shaft means will be adapted to move in unison, a ring gear-like member rotatably mounted to said frame means and having interconnecting means to interconnect the same to said collar means to rotate therewith, spring means having one end interconnected to said frame means and the other end thereof interconnected to said ring gear means whereby rotation of said ring gear-like means in one direction stores energy in said spring means to tend to return said ring gear-like means and said collar means in the opposite rotational direction, and means carried by said frame means to engage said ring gear-like means and prevent the same from rotating in said opposite direction until after the occurrence of an event.

2. A combination as set forth in claim 1 wherein said last-named means comprises a pawl member pivotally mounted to said frame member.

3. A combination as set forth in claim 2 and including another spring means carried by said frame means and tending to pivot said pawl member in a direction to engage said ring gear-like member and tend to prevent said rotation thereof in said opposite direction.

4. A combination as set forth in claim 3 and including means for pivoting said pawl member in a direction away from said ring gear-like member after the occurrence of said event to permit said first-named spring means to rotate said ring gear-like member and said collar means in said opposite direction.

5. A combination as set forth in claim 4 and including means carried by said frame means stopping the rotation of said ring gear-like member and said collar means in said opposite direction before said collar means reaches its "off" position setting.

6. A combination as set forth in claim 1 wherein said collar means has an "off" position, a low temperature position for said thermostat means and a cooking temperature range position for said thermostat, said spring means being adapted to rotate said ring gear-like member and said collar means from a cooking temperature position of said collar means to said low temperature position of said collar means after the occurrence of said event.

7. A combination as set forth in claim 6 and including a timer means carried by said frame means to control the operation of said last-named means that engages said ring gear-like member.

8. A combination as set forth in claim 7 and including a lever pivotally carried by said frame member and being pivoted in one direction after a lapse of a time period set by said timer means to disengage said last-named means from said ring gear-like member.

9. A combination as set forth in claim 8 and including a cam member rotatably carried by said frame means and operatively interconnected to said timer means to be rotated thereby when said timer means is set for a predetermined time period, said cam member controlling the pivot movement of said lever.

10. A combination as set forth in claim 9 and including another spring means carried by said frame means and tending to maintain said lever in engagement with said cam member.

References Cited

UNITED STATES PATENTS

| 1,397,407 | 11/1921 | Dodge | 236—47 |
| 2,471,862 | 5/1949 | Candor | 236—46 |
| 2,545,846 | 3/1951 | Dunn | 236—46 |
| 2,801,799 | 8/1957 | McColloch | 236—46 |
| 2,914,644 | 11/1959 | Holtkamp | 236—15 X |
| 3,032,636 | 5/1962 | Schauer | 236—46 X |
| 3,123,298 | 3/1964 | Wolffe | 236—46 |

WILLIAM J. WYE, *Primary Examiner.*